US009415851B2

(12) United States Patent
Heer

(10) Patent No.: US 9,415,851 B2
(45) Date of Patent: Aug. 16, 2016

(54) RUDDER PROPELLER WITH AN UNDERWATER MECHANISM COMPRISING A PLANETARY GEARING

(75) Inventor: Manfred Heer, Landkern (DE)

(73) Assignee: Schottel GmbH, Spay (DE)

( * ) Notice: Subject to any disclaimer, the term of this patent is extended or adjusted under 35 U.S.C. 154(b) by 320 days.

(21) Appl. No.: 13/980,647

(22) PCT Filed: Jan. 5, 2012

(86) PCT No.: PCT/EP2012/050147
§ 371 (c)(1),
(2), (4) Date: Jul. 19, 2013

(87) PCT Pub. No.: WO2012/098022
PCT Pub. Date: Jul. 26, 2012

(65) Prior Publication Data
US 2013/0303038 A1     Nov. 14, 2013

(30) Foreign Application Priority Data

Jan. 20, 2011    (DE) .................. 10 2011 009 070

(51) Int. Cl.
| | |
|---|---|
| F16H 57/04 | (2010.01) |
| B63H 25/42 | (2006.01) |
| B63H 21/38 | (2006.01) |
| F16C 17/02 | (2006.01) |
| F16C 33/10 | (2006.01) |
| F16C 39/04 | (2006.01) |
| B63H 23/02 | (2006.01) |

(52) U.S. Cl.
CPC ................ *B63H 25/42* (2013.01); *B63H 21/38* (2013.01); *F16C 17/02* (2013.01); *F16C 33/1055* (2013.01); *F16C 39/04* (2013.01); *F16H 57/0479* (2013.01); *B63H 2023/0283* (2013.01); *F16C 2326/30* (2013.01); *F16C 2361/61* (2013.01)

(58) Field of Classification Search
CPC .......... F16H 57/0479; F16H 2057/085; B63H 2023/0283; B63H 21/38; B63H 25/42
See application file for complete search history.

(56) References Cited

U.S. PATENT DOCUMENTS

| | | | |
|---|---|---|---|
| 4,099,478 A * | 7/1978 | Alexander, Jr. .................. 440/6 |
| 4,271,928 A | 9/1981 | Northern | |
| 4,384,498 A | 5/1983 | Eichinger | |
| 5,102,379 A * | 4/1992 | Pagluica et al. ............... 475/331 |
| 2009/0181585 A1 * | 7/2009 | Fukuoka et al. ............ 440/88 L |
| 2013/0303038 A1 | 11/2013 | Heer | |

FOREIGN PATENT DOCUMENTS

| | | |
|---|---|---|
| CH | 393 961 A | 6/1965 |
| DE | 2 110 252 A1 | 9/1972 |
| DE | 28 43 459 A1 | 4/1980 |
| DE | 35 16 604 A1 | 11/1986 |
| DE | 36 24 268 A1 | 1/1988 |

(Continued)

*Primary Examiner* — Huan Le
(74) *Attorney, Agent, or Firm* — Pauley Erickson & Kottis

(57) ABSTRACT

A rudder propeller with an underwater mechanism including a planetary gearing, the planetary gearing including a sun gear, a fixed internal gear and planetary gears, mounted between the sun gear and the internal gear and running on planetary axles of a planet carrier, wherein the planetary gears are mounted on the planetary axles by hydrodynamic slide bearings.

20 Claims, 2 Drawing Sheets

(56) References Cited

FOREIGN PATENT DOCUMENTS

| | | |
|---|---|---|
| DE | 44 45 413 A1 | 4/1996 |
| EP | 2 221 510 A1 | 8/2010 |
| GB | 983462 A | 2/1965 |
| WO | WO 2010/150046 A1 | 12/2010 |

* cited by examiner

RUDDER PROPELLER WITH AN UNDERWATER MECHANISM COMPRISING A PLANETARY GEARING

BACKGROUND OF THE INVENTION

1. Field of the Invention

This invention relates to a rudder propeller with an underwater transmission having a planetary gearing, the planetary gearing including a sun gear, a stationary ring gear, and planet gears mounted between the sun gear and ring gear and supported on planetary axles of a planet carrier.

2. Discussion of Related Art

Rudder propellers of the type mentioned above are known, for example, from German Patent Reference DE 28 43 459 A1. The rudder propeller is used to drive and control a watercraft. The engine torque of a drive motor, which is usually situated inside the watercraft, is transmitted by an above-water transmission via a drive shaft extending vertically downward to an underwater transmission, which usually includes an angle drive and a subsequent planetary gearing, from which the engine torque is finally transmitted to the horizontally extending propeller shaft, which supports the propeller. In order to control the watercraft, the underwater transmission is situated in a housing that can be rotated around the vertical axis.

Inside the planetary gearing, which reduces the speed of the drive motor, such as to a speed suitable for the propeller shaft, the roller bearing mounting of the planet gears that is standard in the prior art is critical because during operation of the rudder propeller, the bearings are subjected to significant loads, in particular alternating loads. The roller elements of the roller bearing mountings used therefore cannot run in optimal fashion and are susceptible to wear. Consequently, there are known proposals to use multilayer roller bearings in lieu of the roller bearing mountings of the planets on the planet axles, but this mounting is very cost-intensive.

SUMMARY OF THE INVENTION

One object of this invention is to avoid disadvantages of the known rudder propeller and to ensure an increased service life and fault tolerance of such a rudder propeller at a relatively low cost and with a relatively simple assembly.

In order to attain the above object and others, according to this invention, the design of a rudder propeller with the features, advantageous embodiments and modifications are described in this specification and in the claims.

This invention proposes supporting the planet gears on the planet axles by hydrodynamic plain bearings so that an overall width of the planet gears and their maximum diameter can be used, resulting in greater rigidity, longer service life, and reduced wear.

The properties of the hydrodynamic bearings, which usually function with a lubricating oil, permit an extremely smooth and wear-free continuous operation of such a planetary gearing, which is easy to manufacture.

Because the coefficient of friction in hydrodynamic plain bearings is a function of the speed, such as the relative speed between the sliding surfaces, it transitions from a static friction at rest through a mixed friction at a low speed, to the desired fluid friction of the lubricating film at a sufficiently high speed. Because marine propulsion systems such as rudder propellers are usually operated at a particular nominal speed or within only a limited speed range, the hydrodynamic plain bearing according to this invention can be calibrated to this speed range.

In order to overcome the mixed friction that is typical for low speeds when starting the rudder propeller and when slowing it to a stop and also when operating at changing speeds, such as when maneuvering, this invention proposes that the planet axles have supply conduits for a lubricant, extending from an infeed opening to the hydrodynamic plain bearing. It is thus possible in these speed ranges, in which static or mixed friction is present, to supply lubricant with a suitable pressure to the hydrodynamic plain bearing in order to facilitate the transition to the desired fluid friction.

According to one embodiment of this invention, this exertion of pressure via the supply conduits can either be implemented by the already provided lubrication system of the rudder propeller or separate lubricant pumps for this purpose. The control can be carried out in a speed-dependent way by a corresponding control unit of the rudder propeller. As soon as the speed range in which fluid friction predominates due to the prevailing relative speed between the sliding surfaces has been reached, the supply of lubricant via the supply conduits can be switched off since it is no longer required at this point in time.

According to one embodiment of this invention, the supply openings are connected to a common feeder conduit for the lubricant provided in the planet carrier so that they communicate with one another. This produces a central lubricant supply inside the planet carrier, which branches into all of the planet axles for the individual planet gears extending from the planet carrier. A planetary gearing includes at least two, preferably three such planet gears together with planet axles.

The pressure of the lubricant that can be exerted in order to facilitate the starting and stopping of the planetary gearing, for example which lies in a relatively low pressure range of a few bar, which can be easily implemented with the existing or already provided lubrication system of the rudder propeller.

On their outer surface oriented toward the planet gear, the hydrodynamic plain bearings are advantageously embodied with a circumferential groove into which the supply conduits feed so that the lubricant film can form directly around the hydrodynamic plain bearing.

In order to achieve the most compact, easy-to-assemble structural unit, the planet axles are inserted, preferably shrink-fitted, into corresponding receiving bores on an end surface of the planet carrier.

According to another embodiment of this invention, the planet gears are supported on the planet axles in cantilevered fashion by the hydrodynamic plain bearings so that it is possible to use the entire tooth width of the planet gears to transmit force.

In another embodiment of this invention, the planet gears are secured to the planet axle on a side oriented away from the planet carrier by a thrust washer to prevent them from shifting axially.

BRIEF DESCRIPTION OF THE DRAWINGS

Other details and embodiments of this invention are explained in greater detail below in view of the drawings, which show one exemplary embodiment, wherein.

DETAILED DESCRIPTION OF THE INVENTION

Figure 2:
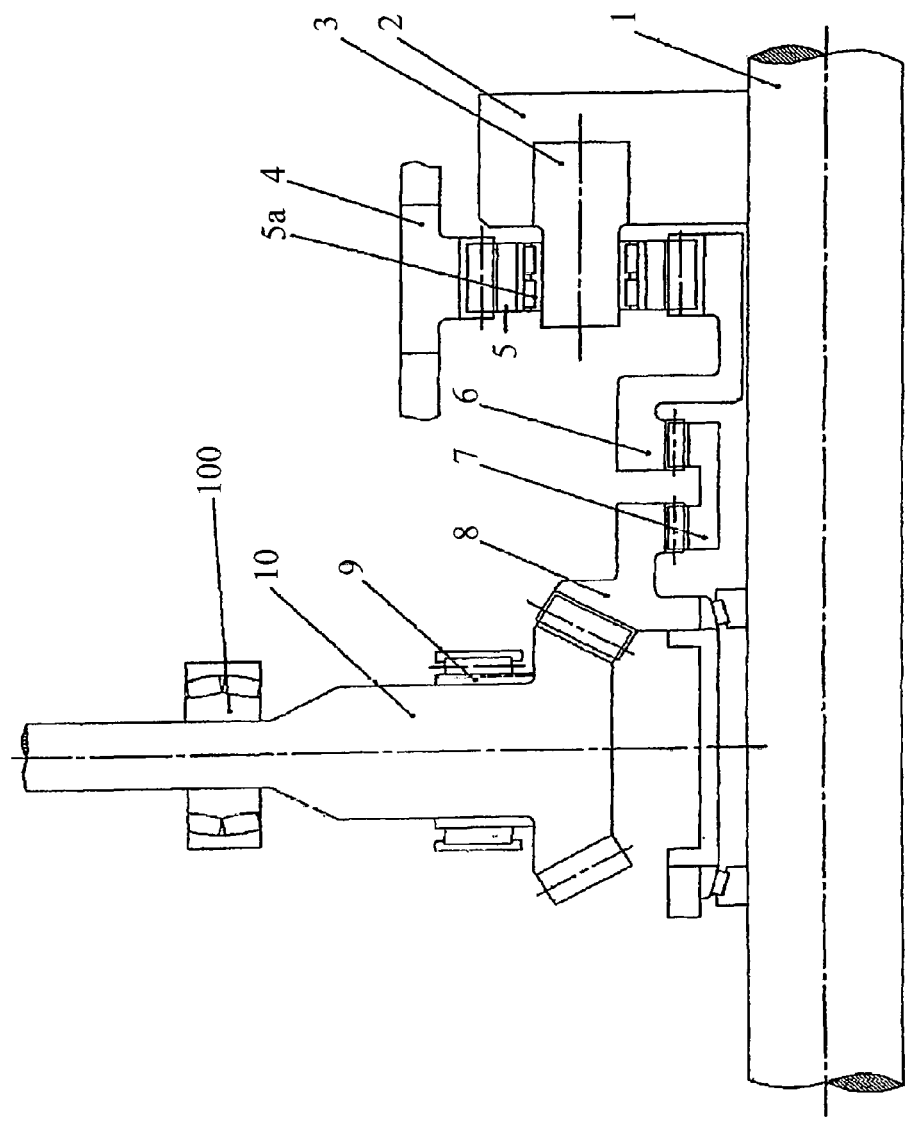
FIG. 2 shows an underwater transmission of a rudder propeller according to the prior art.

FIG. 2 shows a schematically simplified view of the underwater transmission of a rudder propeller according to the prior art.

From a drive motor, which is not shown and is situated above water, a drive shaft 10 that is supported by bearings 100, 9 extends in a vertical direction and inside the underwater transmission shown, ends at a pinion that engages with a bevel gear 8 and together with the latter, forms an angle drive. The bevel gear 8 is supported on a horizontally extending propeller shaft 1, which supports a propeller at one end which is not shown in the drawing. A clutch 7 connects the bevel gear 8 to a sun gear 6 of a planetary gearing. The remaining components of the planetary gearing are a planet carrier 2 with a plurality of planet axles 3 protruding from one end face, roller bearings 5a mounted thereon for supporting planet gears 5, and a fixed ring gear 4. The fixed ring gear 4 is mounted in a manner that is not shown, for example to the housing of the underwater transmission. On the other hand, the planet carrier 2 is shrink-fitted onto the propeller shaft 1 so that the speed of the drive shaft 10, after being redirected by the bevel gear 8, is reduced in speed by the planetary gearing and the propeller shaft 1 is driven at this reduced speed.

The rolling support on the roller bearings 5a of the planet gears 5 used in the exemplary embodiment shown in FIG. 2 is very susceptible to wear due to the alternating loads that occur.

Figure 1:
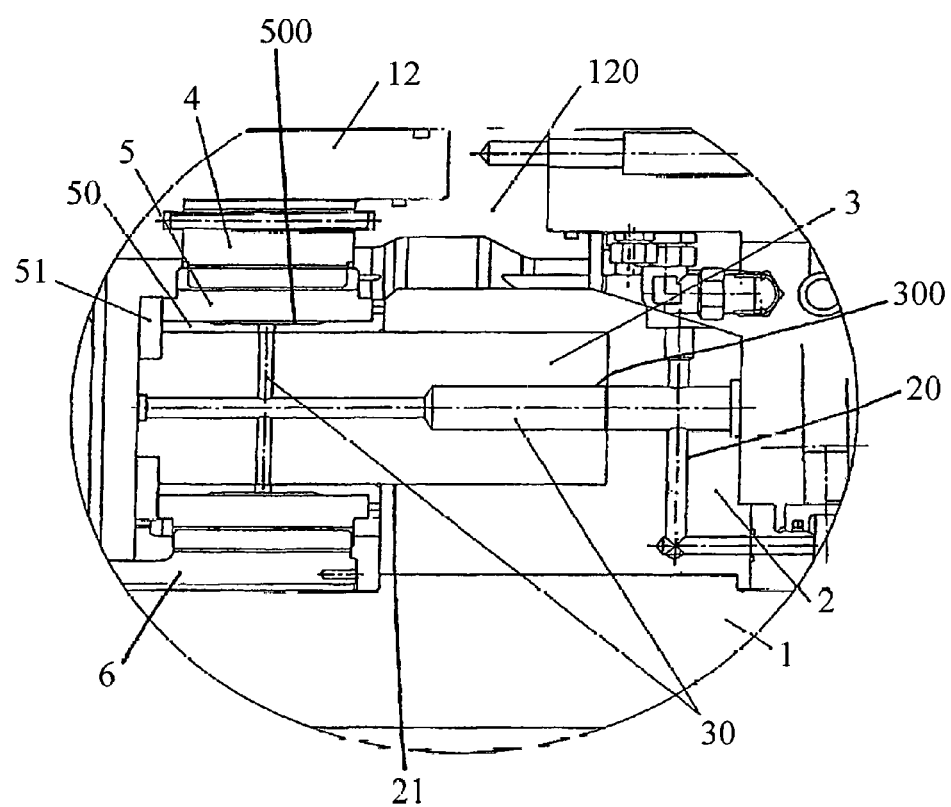
FIG. 1 shows a detail view of a planetary gearing according to this invention.

In the embodiment according to this invention as shown in FIG. 1, a hydrodynamic plain bearing 50 is mounted on each planet axle and supports the planet gear 5 on the planet axle 3.

The planet axle 3 is shrink-fitted into a corresponding receiving bore 21 of the planet carrier 2 and supply conduit 30 for a lubricant initially extending axially from an infeed opening 300, which then branches off at right angles and leads to a groove 500 embodied on the outer surface of the hydrodynamic plain bearing 50.

The infeed opening 300 of the supply conduit 30 communicates with a feeder conduit 20 provided in the planet carrier 2 so that it is possible for a lubricant pump, not shown in detail, for example the usual lubricant pump that is provided inside the underwater transmission, to supply a flow of lubricant via the feeder conduit 20 into the individual supply conduits 30, which is explained in greater detail below.

On the side oriented away from the planet carrier 2, the hydrodynamic plain bearing 50 and the planet gear 5 supported on it are secured by a thrust washer 51 to prevent them from shifting axially on the planet axle 3.

The drawing also shows a part of the housing 12 of the underwater transmission and an accompanying housing cover 120, which jointly fix the ring gear 4 of the planetary gearing.

During operation of a thusly designed underwater transmission for a rudder propeller, when at a standstill, there is a static friction between the plain bearing 50 and the planet gear 5 supported on it. If the rudder propeller is then to be set into operation, for example, the drive shaft 10 and the subsequent parts of the underwater transmission are to be set into rotation, then first, a corresponding control command of the rudder propeller control unit pushes a flow of lubricant with a pressure of a few bar, for example, up to 3 bar, via the feeder conduit 20 to the adjoining supply conduits 30 into the circumferential groove 500 of the hydrodynamic plain bearing 50 in order to rapidly overcome the mixed friction that occurs inside hydrodynamic plain bearings 50 at low speeds. As soon as the mixed friction, which decreases with increasing speed, transitions into the fluid friction that is typical for the hydrodynamic plain bearing, the flow of lubricant and the exertion of pressure with the lubricant via the feeder conduit 20 and the supply conduit 30 are switched off, so that the pumping action achieves the lubricant film required for the bearing on the surfaces of the hydrodynamic plain bearing 50 and planet gear 5 and for this reason, the planet gear rotates in a virtually wear-free fashion and using the entire tooth width between the fixed ring gear 4 and the sun gear 6.

In addition to the above-explained lubricating oil support during the startup of the planetary gearing, such a lubricating oil support can also be activated by the corresponding control unit when bringing the system to a stop, for example, when reducing the speed from the range in which fluid friction predominates.

The invention claimed is:

1. A rudder propeller comprising an underwater transmission having planetary gearing; the planetary gearing including:
    a sun gear (6), a stationary ring gear (4), and a planet gear (5) mounted between the sun gear (6) and the ring gear (4) and supported on a planetary axle (3) of a planet carrier (2), and the planet gear (5) supported on the planet axle (3) by a hydrodynamic plain bearing (50);
    a supply conduit (30) for a lubricant, extending from an infeed opening (300) to the hydrodynamic plain bearing (50); and
    a control unit adapted to adjust a flow of the lubricant through the supply conduit (30) as a function of propeller speed.

2. The rudder propeller according to claim 1, wherein the hydrodynamic plain bearing (50) is supplied with the lubricant as the rudder propeller is started up and until fluid friction predominates due to a prevailing relative speed between the hydrodynamic plain bearing (50) and the planet gear (5).

3. The rudder propeller according to claim 2, wherein a pressure of the lubricant is up to 3 bar.

4. The rudder propeller according to claim 1, wherein the infeed opening (300) communicates with a common feeder conduit (20) for the lubricant in the planet carrier (2).

5. The rudder propeller according to claim 4, wherein the hydrodynamic plain bearing (50) is supplied with the lubricant as the rudder propeller is started up and until fluid friction predominates due to a prevailing relative speed between the hydrodynamic plain bearing (50) and the planet gear (5).

6. The rudder propeller according to claim 5, wherein on an outer surface oriented toward the planet gear (5), the hydrodynamic plain bearing (50) have a circumferential groove (500) into which the supply conduit (30) feeds.

7. The rudder propeller according to claim 6, wherein the planet axle (3), which protrudes from an end face of the planet carrier (2), is inserted into a corresponding receiving bore (21).

8. The rudder propeller according to claim 7, wherein the planet gear (5) is supported on the planet axle (3) in a cantilevered manner by the hydrodynamic plain bearing (50).

9. The rudder propeller according to claim 1, wherein on an outer surface oriented toward the planet gear (5), the hydrodynamic plain bearing (50) has a circumferential groove (500) into which the supply conduit (30) feeds.

10. The rudder propeller according to claim 1, wherein the planet axle (3), which protrudes from an end face of the planet carrier (2), is inserted into a corresponding receiving bore (21).

11. The rudder propeller according to claim 1, wherein the planet gear (5) is supported on the planet axle (3) in a cantilevered manner by the hydrodynamic plain bearing (50).

12. The rudder propeller according to claim 1, wherein the planet gear (5) is secured to the planet axle (3) on a side oriented away from the planet carrier (2) by a thrust washer (51) to prevent shifting axially.

13. The rudder propeller according to claim 1, wherein the supply conduit (30) extends through the planetary axle (3).

14. The rudder propeller according to claim 1, wherein the rudder propeller comprises a rudder propeller lubrication system, and further comprising a lubricant pump independent of the rudder propeller lubrication system, and connected to the supply conduit and controlled by the control unit.

15. The rudder propeller according to claim 1, wherein the hydrodynamic plain bearing (50) is supplied with the lubricant during speed ranges that result in static or mixed friction between the hydrodynamic plain bearing (50) and the planet gear (5).

16. A method for operating a rudder propeller, the rudder propeller having an underwater transmission including planetary gearing with a sun gear (6), a stationary ring gear (4), and a planet gear (5) mounted between the sun gear (6) and the ring gear (4) and supported on a planetary axle (3) of a planet carrier (2), the planet gear (5) supported on the planet axle (3) by a hydrodynamic plain bearing (50) and the planet axle (3) having a supply conduit (30) for a lubricant, extending from an infeed opening (300) to the hydrodynamic plain bearing (50), the method comprising:

supplying a varying amount of the lubricant to the hydrodynamic plain bearing (50) through the supply conduit as a function of a speed of the rudder propeller.

17. The method of claim 16, further comprising supplying the hydrodynamic plain bearing (50) with the lubricant during speed ranges in which static or mixed friction between the hydrodynamic plain bearing (50) and the planet gear (5) is present.

18. The method of claim 16, further comprising:
supplying the hydrodynamic plain bearing (50) with the lubricant as the rudder propeller is started up; and
stopping the supplying of the lubricant upon fluid friction predominating due to a prevailing relative speed between the hydrodynamic plain bearing (50) and the planet gear (5).

19. The method of claim 16, wherein a pressure of the lubricant is up to 3 bar.

20. The method of claim 16, wherein the planet gear (5) is supported on the planet axle (3) in cantilevered fashion by the hydrodynamic plain bearing (50).

* * * * *